United States Patent [19]

Simokat

[11] 4,202,024
[45] May 6, 1980

[54] REPEATER BYPASS PROTECTION APPARATUS

[75] Inventor: Frank L. Simokat, Babylon, N.Y.

[73] Assignee: TII Industries, Inc., Lindenhurst, N.Y.

[21] Appl. No.: 958,646

[22] Filed: Nov. 8, 1978

[51] Int. Cl.² .............................................. H04B 3/56
[52] U.S. Cl. ....................................... 361/91; 361/111; 179/170 R
[58] Field of Search .............. 361/91, 111; 330/207 P; 178/71 T; 179/170 F, 175.35

[56] References Cited

U.S. PATENT DOCUMENTS

| | | | |
|---|---|---|---|
| 3,529,211 | 9/1970 | Brayley | 361/91 |
| 3,586,991 | 6/1971 | Vosteen | 330/207 P |
| 3,656,024 | 4/1972 | Davis | 361/111 |

FOREIGN PATENT DOCUMENTS 1273004  7/1968  Fed. Rep. of Germany ....... 179/170 F Primary Examiner—J. D. Miller
Assistant Examiner—L. C. Schroeder
Attorney, Agent, or Firm—Martin Sachs

[57] ABSTRACT

A repeater bypass protection apparatus includes a means of providing a low current path between the input and output transmission lines coupled to a repeater amplifier. Under normal operating conditions the low current path presents a relatively high impedance and does not interfere with the operation of the repeater amplifier. Under high voltage transient conditions the protection apparatus is activated and effectively protects the repeater amplifier from being destroyed.

11 Claims, 2 Drawing Figures

REPEATER BYPASS PROTECTION APPARATUS

BACKGROUND OF THE INVENTION

1. Field of the Invention

The present invention relates to an over voltage protection apparatus for use in protecting a repeater amplifier, and in particular relates to an apparatus which provides a low current path around the repeater amplifier during high voltage transients.

2. Description of the Prior Art

Prior art protection devices which are utilized to protect equipment, such as repeater amplifiers that are connected to transmission lines, attempt to absorb or bypass the high voltage surges occurring on the transmission lines by providing a shunt path to ground. The shunt path usually includes a carbon block device or a gas fired device which breaks down (conducts) when transients higher than the breakover voltage of the protection device occurs, thereby preventing the voltage surges from reaching any equipment connected to the transmission lines. Frequently, these devices include a fuseable link which shorts out the device and opens the transmission line, when high voltage transient exists for any length of time greater than can be absorbed by the protective device. This requires that the fuseable link portion, if not the whole protection device, be replaced after a high voltage transient surge is experienced.

Typical of these devices is U.S. Pat. No. 3,890,543 issued on June 17, 1975 to Gaylord D. Jonassen. Jonassen discloses a low voltage surge protection network, which includes a multi-electrode gas tube arrester having an optional integral temperature sensitive lift-off capability, wherein the multi-electrode gas tube arrester has directly across it, back-to-back zener diodes, such that voltage imbalance conditions induced across a line pair are corrected within a time interval sufficient to prevent damage to low voltage operating equipment electrically coupled across the line pair. Another device which discloses a similar type of protection is U.S. Pat. No. 4,068,277 issued Jan. 10, 1978 to Frank L. Simokat. The patent to Simokat discloses a protector, which includes a three element gas tube serially connected with a heating element, the combination being connected in shunt across the load to be protected. Between the protecting shunt path and the source, a normally closed switch is provided which is responsive to the heating element and opens in the event of sustained over voltage conditions. Accordingly, a prolonged surge which might otherwise destroy the gas tube and/or the protection load, is isolated from both the shunt protection branch and from the load, thus preventing damage to both.

Other devices known in the art provide protection by providing a narrow spark gap which breaks down (arcs over) to short the voltage surge to ground, thereby protecting the equipment. These devices, however, frequently fail in use and must be replaced, because of damage produced during the protective arcing mode. Typical of these devices is U.S. Pat. No. 4,037,266 issued on July 19, 1977 to J. H. English, et al.

Other known techniques include the combination of carbon blocks for arcing utilized together with transformers and coils to buck-out the surge voltage by inducing voltages in a series path of opposite polarity. Typical of these devices would be U.S. Pat. No. 2,338,405 issued to C. C. Cash et al on July 3, 1941. Yet another approach utilizes a zener diode configuration connected in shunt with the transmission line and a resistor attenuator pad to help absorb some of the energy once the zener diode goes into conduction. This is further backed up with a carbon block protector to absorb some of the energy of a lightning strike to the transmission line. Typical of this type of approach is disclosed in U.S. Pat. No. 3,181,033 issued to H. L. Bakker on Nov. 15, 1961. Still another approach is disclosed in U.S. Pat. No. 4,068,282 issued to F. D. Rigollet. Rigollet discloses a circuit arrangement wherein the transmission line is completely disconnected from the sending and receiving devices. The coupling between the transmission line and the sending and receiving devices includes optical coupling between the transmission line and the sending and receiving devices. With this approach a lightning strike on the transmission line would not be connected to the sending or receiving devices or repeater amplifiers which may be isolated in this manner.

Therefore, it is an object of the present invention to provide a reliable means for isolating the repeater amplifiers from high voltage transients appearing on the transmission lines coupled thereto.

It is a further object of the present invention to provide a reliable means for bypassing the voltage surges appearing on the transmission lines around a repeater amplifier utilized thereon.

It is still another object of the present invention to provide a repeater bypass protection apparatus which does not interfere with the signal appearing on the transmission line and/or repeater in normal operation, but will effectively protect the repeater apparatus during high voltage transients.

The foregoing and other objects and advantages will appear from the description to follow. In the description, reference is made to the accompanying drawing which forms a part hereof, and in which is shown by way of illustration a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope in the present invention is best defined by the appended claims.

SUMMARY OF THE INVENTION

The present invention overcomes the shortcomings found in the prior art by providing a current path around the repeater amplifier apparatus utilized in conjunction with the transmission lines.

A repeater bypass protection apparatus for repeaters having a pair of input and output terminals connected respectively to input and output transmission lines, according to the principles of the present invention comprises, in combination, first and second coil means having a center tap. The first coil means is connected across the input terminals and the second coil means is connected across the output terminals. A current path means is connected between the first coil means center tap and the second coil means center tap and provides a DC current path therebetween. The current path has a relatively high impedance during normal operating conditions and essentially instantaneously changes to a relatively low impedance during over voltage transients appearing on the input transmission lines. Capacity means is connected between the second coil means center tap and ground to block DC current flow therebetween. Preferably included, are first and second lightning arrester means, each having a pair of active electrode terminals and a ground terminal. One of each active terminal of said first lightning arrester means is connected to each of the input transmission lines, and one of each active terminal of the second lightning arrester means is connected to each of the output transmission lines. The ground terminals of the first and second arrester means are connected to the ground.

BRIEF DESCRIPTION OF THE DRAWING

In order that the invention may be more fully understood, it will now be described by way of example, with reference to the accompanying drawing, in which.

DESCRIPTION OF THE PREFERRED EMBODIMENTS

Figure 1:
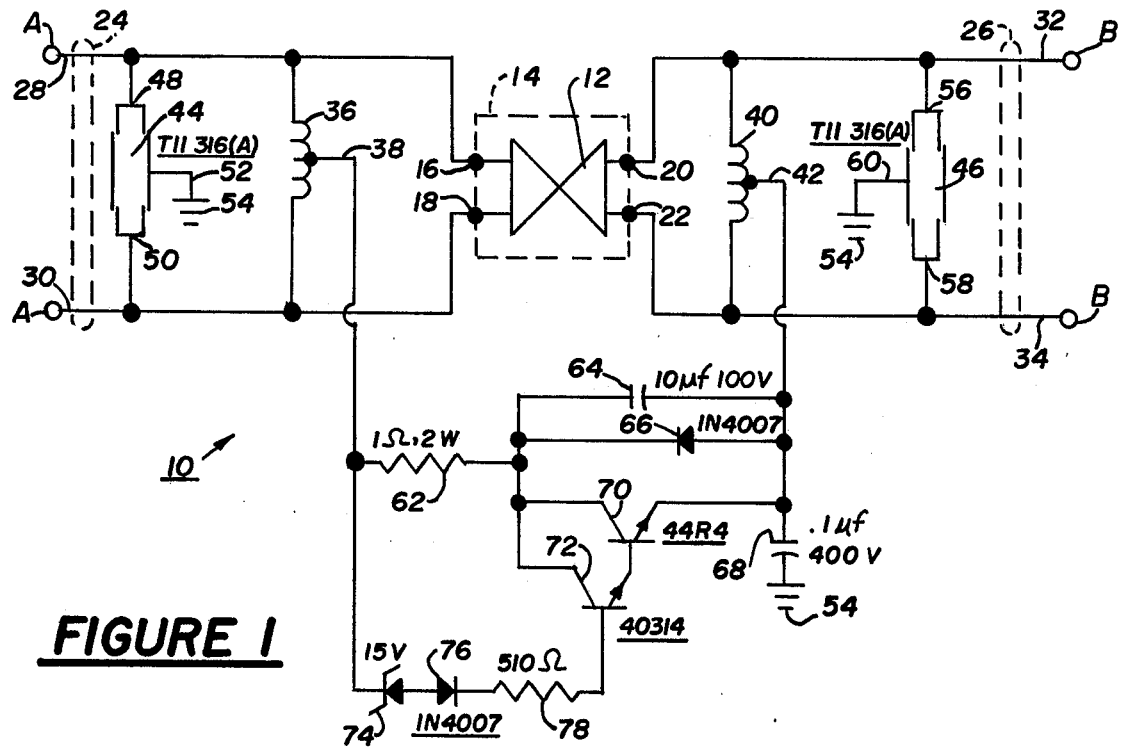
FIG. 1 is a schematic circuit diagram of a repeater bypass protection apparatus, according to the principles of the present invention.

Referring now to the drawings, and in particular to FIG. 1, which discloses a preferred circuit arrangement of a repeater bypass protection apparatus 10. The protection apparatus 10 does not include the repeater amplifier 12 shown within the dotted line 14. The protection apparatus 10 is shown connected to a repeater amplifier 12 which has a pair of input terminals 16 and 18 and a pair of output terminals 20 and 22 which are connected to an input transmission line 24 and an output transmission line 26, respectively. The input transmission line 24 includes two conductive wires 28 and 30 and the output transmission line 26 includes two conductive wires 32 and 34. The input and output transmission line wires would generally have a potential difference across them of approximately 10 volts DC, not shown. This DC voltage is normally supplied to operate the solid state (transistor) repeater amplifier 12.

Connected across the wires 28 and 30 of input transmission line 24 is a coil 36 which is provided with a center tap 38.

A coil 40, provided with a centertap 42 is connected across wires 32 and 34 of output transmission line 26.

A DC current path is provided between center tap 38 of coil 36 and the center tap 42 of coil 40 to prevent any surge voltages and currents associated therewith from entering the repeater amplifier 12 and causing damage thereto. Under normal operating conditions the current path is a relatively high impedance. However, when a transient or other voltage exists on the input transmission line 24, it is essentially instantaneously coupled to output transmission line 26, thereby bypassing the repeater amplifier 12. In order to further protect amplifier 12 a shunt bypass path may also be included. The shunt bypass path may consist of a gas tube, sometimes referred to as a lightning arrester 44 and 46, connected across the input and output transmission lines 24 and 26, respectively. Each arrester 44 and 46 includes two active electrodes and a ground electrode with gaps provided therebetween. Striking one gap will cause the other gaps to fire virtually simultaneously. Preferably a TII-316(A) surge arrester, manufactured by Telecommunication Industries, Inc. of Lindenhurst, N. Y., may be utilized for arresters 44 and 46. One active electrode 48 is connected to wire 28 while the other active electrode 50 is connected to wire 30 with the third electrode 52 connected to ground 54. Thus, a high voltage input transient appearing on line 28 or 30, which would occur if the transmission line 24 was hit by lightning, would cause the gas within arrester 44 to ionize essentially instantaneously, thereby forming a low resistance current path to ground 54, via terminal 52, and thereby, dropping the voltage across the lines 28 and 30 to a safe voltage, causing no damage to any components across the line.

In a similar manner, the active electrodes 56 and 58 are connected to wires 32 and 34 respectively, of output transmission line 26, thereby protecting the output transmission line from excessive voltage transients, by providing a current path to ground 54, via the third electrode 60 of arrester 46 once it becomes ionized, because of the voltage transient.

To further protect repeater 12, the current path provided between the center tap 38 and center tap 42 of coils 36 and 40, respectively, is provided with a voltage sensitive semi-conductor circuit arrangement, which includes a resistor 62 that has one end thereof connected to the center tap 38 of coil 36. The other end of resistor 62 is connected to one end of a capacitor 64 and the cathode electrode of a diode 66. The other end of capacitor 64 and the anode electrode of diode 66 are connected to the center tap 42 of coil 40. A capacitor 68 is connected from center tap 42 to ground 54.

A pair of transistors 70 and 72 are connected in a well-known Darlington configuration with the emitter electrode of transistor 70 being connected to the center tap 42 of coil 40, and the collector electrodes of transistors 70 and 72 being connected to the cathode electrode of diode 66. (The emitter electrode of transistor 72 is connected to the base electrode of transistor 70). A zener diode 74 has its cathode electrode connected to center tap 38 of coil 36. The anode electrode of zener diode 74 is connected to the anode of diode 76. The cathode electrode of diode 76 is connected, via a resistor 78, to the base electrode of transistor 72. Preferably, zener diode 74 has a break-over voltage of approximately 15 volts, and is serially connected with oppositely poled diode 76 and resistor 78.

Thus, with the circuit configuration as described there is very little current flow under normal operating conditions (essentially zero) between the center tap 38 and the center tap 42. However, when a voltage transient occurs which exceeds 15 volts, zener diode 74 starts to conduct current which will flow into the base electrode of transistor 72, thus turning it into a more conductive state. This in turn will cause transistor 70 to become more conductive and as the voltage increases, transistors 70 and 72 are driven into saturation, thus enabling them to carry a maximum of current therethrough. The current between center tap 38 and center tap 42 will only be limited by resistor 62 which is preferably approximately one ohm.

A voltage occurring on either of the wires 32 or 34, which exceeds the voltage appearing on wires 28 and 30, will cause a current of flow from center tap 42 of coil 40 through diode 66 and resistor 62 to center tap 38 of coil 36. Thus, a voltage transient greater than can be tolerated by repeater amplifier 12 will be shunted or passed around the amplifier, thereby causing no internal damage to it.

It is to be noted that current is unable to flow in the path that includes zener diode 74, diode 76 and resistor 78 because diode 76 is oppositely poled from zener diode 74 and it will block current flow in that path when current is attempting to flow from center tap 42 to center tap 38. Capacitor 64 functions to instantaneously pass a transient current surge therethrough until transistors 70 and 72 can fully saturate.

Although only two transistors are shown in a Darlington configuration, it is known by those knowledgeable in the art, that any number of transistors may be used in this type of configuration to increase the circuit gain and thus lower the saturated impedance drop occurring thereacross.

Capacitor 68 functions to pass any sudden changes or low level transients to ground instantaneously while keeping the center tap 42 above ground by the DC operating voltage appearing thereat.

Figure 2:
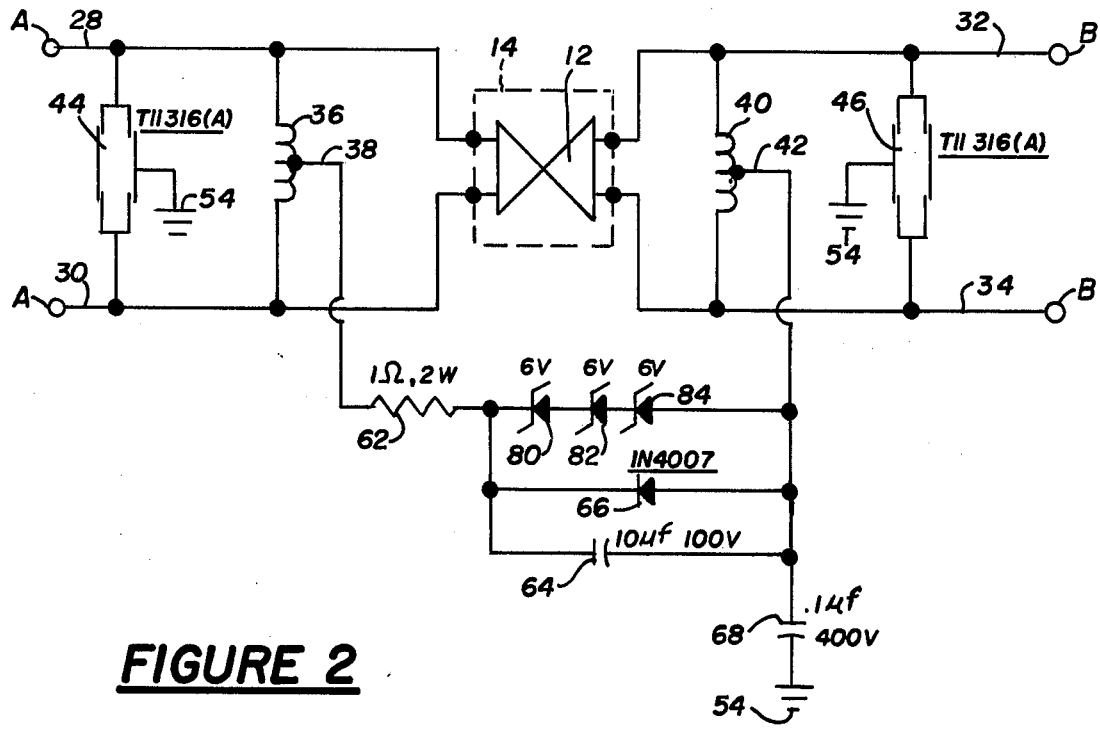
FIG. 2 is a schematic circuit diagram of an alternate embodiment of the present invention.

Referring now to FIG. 2, wherein like components have been given the same numeral designation, it is to be noted that zener diode 74, diode 76, and resistor 78 have been deleted in this alternate embodiment of the preferred circuit arrangement. Transistors 70 and 72 have been replaced by three zener diodes 80, 82 and 84, which are serially connected, with the anode electrode of diode 84 connected to center tap 42 of coil 40. The cathode electrode of zener diode 84 is connected to the anode electrode of zener diode 82. The cathode electrode of zener diode 82 is connected to the anode electrode of zener diode 80. The cathode electrode of zener diode 80 is connected to one end of resistor 62 which in turn has its other end connected to the center tap 38 of coil 36. Thus, a voltage transient occurring on lines 28 and 30 would cause current flow through the zener diodes 80, 82 and 84 only when the voltage exceeds the zener break-over voltage, which in the preferred embodiment would be 18 volts (6 volts across each diode). Current flow from the center tap 38 to the center tap 42 would be minimal during normal operating conditions, however, once the voltage difference between lines 28 and 30 exceeds the voltage appearing on lines 32 and 34 by a value in excess of the zener break-over voltage, current will flow through the zener diodes 80, 82 and 84, thus shunting the current from the repeater amplifier and having it flow from the input transmission line to the output transmission line. If voltage on the output transmission lines (lines 32 and 34) should exceed the voltage appearing on the input transmission lines 28 and 30, current will flow from the center tap 42 of coil 40 to the center tap 38 of coil 36, the diode 66 and resistor 62. Here again, the repeater amplifier 12 is protected by this bypass current path. The functioning of arresters 44 and 46 is exactly as explained with regard to the circuit arrangement shown in FIG. 1.

Here again, it is to be noted that although three zener diodes each having a zener break-over voltage of six volts has been described, any number of zener diodes, Shockley diodes, etc. may be used, as long as the break-over voltage is below that tolerable by the repeater amplifier to be protected.

The value of the components shown on the drawing are the values utilized in fabricating the preferred embodiments.

In order to fabricate a compact assembly it is envisioned that all the components will be placed in a suitably small compact housing. The housing, not shown, will include a pair of input terminals A—A to which the input transmission line is to be connected and a second pair of terminals B—B to which the output transmission line is to be connected. Terminals A—A would be connected to terminals 16 and 18 of the repeater amplifier 12 and terminals B—B would be connected to terminals 20 and 22 of the repeater amplifier 12. Thus, by connecting to the input and output terminals of the repeater amplifier, a simple installation is anticipated. A connection to ground will also be provided by a terminal labeled ground which will be connected to ground point 54.

Hereinbefore has been disclosed a means of protecting a solid state transistorized repeater amplifier from voltage transients in excess of its maximum safe operating value. It will be understood that various changes in the detail, materials, arrangements of parts, and operating conditions which have been herein described and illustrated in order to explain the nature of the invention, may be made by those skilled in the art within the principles and scope of the present invention.

Having thus set forth the nature of the invention, what is claimed is:

1. A repeater bypass protection apparatus for repeaters having a pair of input and output terminals connected respectively to input and output transmission lines, comprising, in combination:
   (a) first and second coil means having a center tap, said first coil means being connected across said input terminals, said second coil means being connected across said output terminals;
   (b) current path means connected between said first coil means center tap and said second coil means center tap for providing a D.C. current path therebetween, said current path having a relatively high impedance during normal operating conditions and essentially instantaneously changing to a relatively low impedance during over voltage transients appearing on said input transmission lines; and
   (c) capacitor means connected between said second coil means center tap and ground for blocking D.C. current flow therebetween.

2. A repeater bypass protection apparatus according to claim 1 further including first and second lightning arrester means, each having a pair of active electrode terminals and a ground terminal, one of each active terminal of said first lightning arrester means being connected to each said input transmission line, one of each active terminal of said second lightning arrester means being connected to each said output transmission line, said ground terminals of said first and second arrester means being connected to said ground.

3. A repeater bypass protection apparatus according to claim 1 wherein said D.C. current path means includes voltage sensitive semiconductor means.

4. A repeater bypass protection apparatus according to claim 3 wherein said voltage sensitive semiconductor means comprises:
   (a) transistor means having emitter, collector, and base electrodes, said emitter and collector electrodes being coupled between said center tap of said first and second coil means; and
   (b) zener diode means coupled to the base electrode of said transistor means from said coil means center tap.

5. A repeater bypass protection apparatus according to claim 4 wherein said transistor means coupling includes resistance means and said zener diode means coupling includes resistance means and an oppositely poled diode means.

6. A repeater bypass means protection apparatus according to claim 3 wherein said voltage sensitive semiconductor means comprises:
   (a) zener diode means coupled between said center tap of said first and second coil means; and
   (b) diode means connected in parallel with said zener diode means and poled similarly; and
   (c) capacitor means connected in parallel with said diode means.

7. A repeater bypass protection apparatus according to claim 6 wherein said zener diode coupling includes resistance means.

8. A repeater bypass protection apparatus according to claim 4 wherein said transistor means includes a plurality of transistors in a Darlington configuration.

9. A repeater bypass protection apparatus according to claim 3 wherein said voltage sensitive semiconductor device includes a Shockley avalanche semiconductor.

10. A repeater bypass protection apparatus for repeaters having a pair of input and output terminals connected respectively, to input and output transmission lines, in combination:
   (a) first and second coil means having a center tap, said first coil means being connected across said input terminals, said second coil means being connected across said output terminals;
   (b) current path means connected between said first coil means center tap and said second coil means center tap for providing a DC current path therebetween, said current path having a relatively high impedance during normal operating conditions and essentially instantaneously changing to a relatively low impedance during over voltage transients appearing on said input transmission lines and including;
      (i) transistor means having emitter, collector, and base electrodes said emitter and base electrodes being resistively coupled between said center tap of said first and second coil means, and
      (ii) zener diode means resistively coupled between said base electrode and said coil means center tap;
   (c) capacitor means connected between said second coil means center tap and ground for blocking D.C. current flow therebetween; and
   (d) first and second lightning arrester means each having a pair of active electrode terminals and a ground terminal, each active terminal of said first lightning arrester means being connected to said input transmission lines, one of each active terminal of said lightning arrester means being connected to each said output transmission lines, said ground terminal of said first and second arresters being connected to said ground.

11. A repeater bypass protection apparatus for repeaters having a pair of input and output terminals connected respectively, to input and output transmission lines, in combination:
   (a) first and second coil means having a center tap, said first coil means being connected across said input terminals, said second coil means being connected across said output terminals;
   (b) current path means connected between said first coil means center tap and said second coil means center tap for providing a D.C. current path therebetween, said current path having a relatively high impedance during normal operating conditions and essentially instantaneously changing to a relatively low impedance during over voltage transients appearing on said input transmission lines and including:
      (i) zener diode means resistively coupled between said center tap of said first and second coil means,
      (ii) diode means connected in parallel with said zener diode means and poled similarly, and
      (iii) first capacitor means connected in parallel with said diode means;
   (c) second capacitor means connected between said second coil means center tap and ground for blocking D.C. current flow therebetween; and
   (d) first and second lightning arrester means each having a pair of active electrode terminals and a ground terminal, each active terminal of said first lightning arrester means being connected to said input transmission lines, one of each active terminal of said lightning arrester means being connected to each said output transmission lines, said ground terminal of said first and second arresters being connected to said ground.

* * * * *